United States Patent [15] 3,671,605
Smith, Jr. [45] June 20, 1972

[54] ISOMERIZATION OF ALLENES INTO THEIR CORRESPONDING TERMINAL ACETYLENIC ISOMERS

[72] Inventor: William Novis Smith, Jr., Exton, Pa.
[73] Assignee: Foote Mineral Company, Exton, Pa.
[22] Filed: Dec. 14, 1970
[21] Appl. No.: 98,043

Related U.S. Application Data

[62] Division of Ser. No. 858,107, Sept. 15, 1969, abandoned.

[52] U.S. Cl. ...................................................260/678
[51] Int. Cl. .......................................................C07c 11/24
[58] Field of Search ..........................260/678, 679, 683.15 E

[56] References Cited

UNITED STATES PATENTS 3,175,021  3/1965  Vanselow et al. ..................260/683.15
3,175,020  3/1965  Wilkes ..............................260/683.15
2,216,437  10/1940  Halbig et al. ..........................260/678
2,755,319  7/1956  Baggett ................................260/678

Primary Examiner—Delbert E. Gantz
Assistant Examiner—J. M. Nelson
Attorney—Howson and Howson

[57] ABSTRACT

A catalyst for the isomerization of allenes into their corresponding terminal acetylenic isomers is prepared by combining an alkali metal having an atomic weight greater than that of lithium with alumina in the presence of sufficient heat for the free alkali metal to melt and react with the alumina. Passing a stream of an allene compound through a bed of this catalyst converts the allene into the corresponding terminal acetylenic isomer.

10 Claims, No Drawings

ISOMERIZATION OF ALLENES INTO THEIR CORRESPONDING TERMINAL ACETYLENIC ISOMERS

This application is a division of co-pending application, Ser. No. 858,107 filed Sept. 15, 1969 now abandoned.

BACKGROUND OF THE INVENTION

Acetylene, HC ≡ CH (ethyne), and members of the acetylene series are important industrial chemicals used in the manufacture of vinyl chloride, neoprene, acrylonitrile, trichloroethylene, prechloroethylene and other acetylene derivatives. Acetylene is also widely used in combination with oxygen or air in metal welding and as a luminant.

Historically, acetylene has been manufactured by a reaction between water and calcium carbide. More recent processes involve the manufacture of acetylenes from hydrocarbons. One method of preparing acetylenes from hydrocarbons involves the isomerization of allenes into acetylenes.

DESCRIPTION OF THE PREFERRED EMBODIMENTS

This invention relates to a novel catalyst for the isomerization of allenes into their corresponding terminal acetylenic isomers, a method for preparing this catalyst and a process utilizing the catalyst in the isomerization of allenes into acetylenes.

It is the object of the invention to provide a novel method for isomerizing allenes into their corresponding terminal acetylenic isomers.

According to this invention an alkali metal having an atomic weight greater than that of lithium is combined with alumina ($Al_2O_3$), and the mixture is heated to melt the alkali metal and form the novel isomerization catalyst. During the heating process the mixture is agitated and mixed. The heating and agitation is continued until reaction no longer occurs as noted by the substantial disappearance of the alkali metal and marked darkening of the mixture. The heating and mixing is carried out in an atmosphere inert to the alkali metal, that is, in an atmosphere substantially free of water vapor, oxygen and carbon dioxide, such as that provided by inert gases, like nitrogen, argon and the like.

The alkali metal utilized in the preparation of the isomerization catalyst will be one having an atomic weight greater than that of lithium (6.94); namely, sodium, potassium, rubidium or cesium, preferably sodium or potassium. Lithium metal is not satisfactory. A combination of two or more different alkali metals may be used. The alkali metal is mixed with the alumina in the form of the free metal and may be in any particle size. That is, the alkali metal may be finely ground or it may be in the form of particles varying in size from one-fourth-inch to one-half-inch pieces. The alkali metal may also be employed in the well known dispersion form. These are prepared by stirring the molten metal into an inert liquid, such as mineral oil or toluene, so that the metal solidifies as very tiny droplets, usually no more than about 100 microns in size and preferably from about 25 to about 75 microns. The finely divided metal may be filtered from the liquid to provide, after washing and drying, what is known as a dry dispersion, and combined with the substrate in this form. The smaller the size of the alkali metal, the more quickly it will react when in contact with the alumina due to the increase in surface area.

The alumina with which the alkali metal is combined is porous, and preferably finely ground prior to mixing with the alkali metal. The alumina, for example, is preferably reduced in conventional grinding operations to a material having a particle size through 20 mesh, preferably through 100 mesh, and especially through 200 mesh. The alumina is also advantageously preliminarily dried, as by heating to from about 150° to about 300° C., preferably under vacuum. The alumina need not be completely pure, and it may contain other inorganic constituents substantially inert to the allenes and acetylenic isomers so long as the alumina predominates; that is, the substrate is at least about 75 percent alumina.

In combining the alkali metal with the alumina, the former is mixed with the latter in a proportion of from about 2 to about 25 percent, by weight, preferably from about 2 to about 20 percent, by weight, and more particularly from 7.5 percent to about 10 percent, by weight, of the alkali metal based on the weight of the alumina.

The alkali metal-alumina mixture is heated under an inert atmosphere with constant agitation until the alumina has reacted with substantially all of the free alkali metal present in the reaction mixture. The temperature required is that sufficient to melt the alkali metal used; thus, the precise temperature utilized will vary with the alkali metal chosen. For example, if the alkali metal is sodium, a temperature of at least 97° C. is required, while potassium requires a temperature of at least 62° C. to be completely combined with the alumina. Lower temperatures may be satisfactory with cesium and rubidium as these melt at 26° and 38° C., respectively. The temperature employed may far exceed the melting point of the particular alkali metal. However, no advantage is gained by exceeding about 200° C.

It is important that the alkali metal be combined with the alumina in an atmosphere substantially free of oxygen, carbon dioxide and water vapor, as under a blanket of an inert gas such as argon, nitrogen, or the like. Thus, for example, when sodium or potassium is combined with the substrate, it is desirable to effect the combination under an atmosphere of nitrogen.

In addition, constant agitation of the mixture is highly desirable to insure uniform and complete reaction of the molten alkali metal with the alumina. Any suitable mechanical means may be utilized to accomplish the desired agitation.

When the inert substrate reacts with the molten alkali metal, it becomes extremely basic due to the presence of the free alkali metal. It is thought that free electrons from the molten alkali metal migrate into the porous substrate to form a complex basic mixture. During reaction, the free alkali metal as such disappears and the mixture darkens noticeably, becoming almost black at the sites where the alkali metal and alumina have reacted. The substantial disappearance of the alkali metal denotes essential completion of the reaction.

After the alkali metal has been reacted with the alumina, the mixture is cooled to ambient temperatures and preferably ground to break up any lumps formed during the melting and mixing procedure and to increase the surface area of the catalyst. The mixture is ground in a conventional manner and a catalyst having a particle size through 20 mesh is preferred although coarser particles may be utilized. The ground catalyst is then formed into a bed, preferably in the form of a column enclosed in any suitable manner, such as in glass tubing.

The catalyst prepared by the procedure outlined above is extremely stable and well suited for the catalysis of isomerization reactions in which allenes are converted into their corresponding terminal acetylenic isomers.

The isomerization reaction follows the following equation:

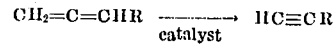

wherein R is H or an alkyl containing from one to 10, preferably from two to three, carbon atoms. The allenes, which may be employed in a gaseous or liquid state, include allene itself (propadiene), methyl allene (1,2-butadiene), ethyl allene (1,2-pentadiene), 1,2-hexadiene, 1,2-heptadiene, 1,2-octadiene, 1,2-nonyldiene, 1,2-decyldiene, 1,2-undecyldiene, 1,2-dodecyldiene, and 1,2-tridecyldiene. The allene may be substantially pure or in admixture with another compound or compounds, including its acetylenic isomer. Particularly desirable, because of its general availability and low cost is a commercial welding gas which is a gaseous mixture of methyl acetylene (propyne) and allene in which the weight ratio of propyne to allene is about 1:1 with from about 30 to 40 percent of saturated $C_1$ - $C_4$ hydrocarbons, principally propane and butane (e.g., "MAPP" of Dow Chemical Company). In addition to the use of a single allene or the stated mixture, other mixtures of allenes, such as allene and acetylenes, such as methyl acetylene, may be isomerized. The proportion of acetylene to allene in such mixtures may be at any ratio below the equilibrium ratio referred to below.

The terminal acetylene produced by the isomerization reaction will be an isomer of the allene reactant. Whether the initial reactant is a pure allene or a mixture of an allene with its isomeric acetylene, the resulting product will be in the form of an equilibrium mixture in which the terminal acetylenic isomer predominates by about 80 percent or more.

In the isomerization reaction, a stream of the allene-containing material is passed through the catalyst bed prepared as discussed herein. As the allene stream is passed through the bed, individual particles of catalyst in the bed adsorb the reactant until they become saturated with the allene. This adsorption is reversible, and upon saturation the catalyst particle gives up the adsorbed reactant which has been isomerized to the corresponding acetylenic isomer, thus maintaining an equilibrium between the allene reactant and the terminal acetylenic product. The catalysts prepared according to this invention are extremely stable with no change in the equilibrium of the product occurring after as much as fifteen hours of continuous operation.

The isomerization reaction is carried out at a temperature varying from about −10° to about 100° C., preferably from about 10° to about 15° C. Operation at temperatures above the preferred range generally results in products in which the equilibrium shifts towards the allene. The temperature of the reaction has a bearing on the ratio of allene to terminal acetylenic isomer produced by the reaction. For example, in a reaction in which the product is an equilibrium mixture of allene and methyl acetylene, the ratio of allene to methyl acetylene in the reaction product will vary from 20:80 at 100° C. to 4:96 at 10°–15° C. when the reaction is carried out at a uniform rate of flow. Moreover, the 4:96 ratio of allene to methyl acetylene will be maintained so long as the temperature of the reaction remains between 10°–15° C. even if the rate of flow of the reactants is increased.

Generally speaking, the rate of flow is not critical and can vary with the length of the catalyst column, the rate of flow increasing in proportion to the increase in the length of the column. For example, with a glass tube 16 mm I.D. by 20 inches long, little difference in the equilibrium proportion has been noted, at a given temperature, in flow rates ranging from 100 cc. per minute to 1,200 cc. per minute.

This invention will be more fully understood from a consideration of the following examples which are given for the purpose of illustration only.

EXAMPLE I 21 grams of sodium metal was added to 240 grams of alumina ground to −200 mesh. The mixture was heated under an inert atmosphere of nitrogen to 200° C. with agitation and then cooled. The mixture was powdered to remove agglomerated particles and then packed in a glass tube 16 mm. I.D. × 20 inches long under an inert atmosphere. A gaseous mixture containing about 60–70 percent of a 45 percent methyl acetylene and 55 percent allene mixture, the balance being saturated hydrocarbons having one to four carbon atoms, mainly propane and butane ("MAPP" welding gas of Dow Chemical Company) was passed through the column at 100 cc/min. The reaction was carried out at 100° C. and the ratio of the allene to methyl acetylene in the product was 20:80.

EXAMPLE II

Example I is repeated at 10°–15° C. for the isomerization reaction, and the ratio of the allene to methyl acetylene in the product was 4:96.

EXAMPLE III

Example I is repeated at 10°–15° C. for the isomerization reaction, and the gaseous mixture was passed through the column at 1,200 cc/min. The ratio of allene to methyl acetylene in the product was 4:96.

EXAMPLE IV

Example II is repeated at 10°–15° C. for the isomerization reaction with pure allene passed through the column. The product was a mixture of allene and methyl acetylene in a ratio of 4:96.

EXAMPLE V 17.5 grams of potassium metal was added to 199 grams of alumina reduced to −200 mesh. The mixture was heated under an inert atmosphere of nitrogen to 159° C. with agitation. The material was then cooled and powdered to remove agglomerated material. The mixture was placed in a 16 mm I.D. by 20 inch glass tube under an inert atmosphere. A gas mixture as used in Examples I–III was passed through the column at 0°–10° C. at a flow rate of 1,200 cc/min. The equilibrium value of the product was 95 parts of methyl acetylene: 5 parts of allene.

Modification in the selection of alkali metals and alumina-containing substrate and in allene-containing material and in the particular procedural steps and conditions is possible without departing from the scope of the invention as set forth in the appended claims.

Having thus described this invention, I claim:

1. A process for the isomerization of allenes into their corresponding terminal acetylenic isomers which comprises passing an allene compound through a catalyst consisting essentially of the reaction product of (a) a molten alkali metal having an atomic weight greater than that of lithium, and (b) alumina, said alkali metal being combined with said alumina in a proportion of from about 2 to about 25 percent, by weight, based on the weight of the alumina, said isomerization being carried out at a temperature sufficient to produce an equilibrium mixture of the allene compound and corresponding terminal acetylenic isomer containing at least about 80 percent of the latter.

2. A process according to claim 1 wherein said allene has the formula $CH_2 = C = CHR$ wherein R is hydrogen or an alkyl group containing from one to 10 carbon atoms.

3. The process according to claim 2 wherein said allene component is 1,2-propadiene.

4. The process according to claim 3 wherein said allene component is in the form of a gaseous mixture containing about 60–70 percent of a 45 percent methyl acetylene : 55 percent allene mixture, the balance being saturated hydrocarbons containing from one to four carbon atoms.

5. A process according to claim 1 wherein said isomerization is carried out at a temperature of from about −10° to about 100° C.

6. A process according to claim 1 wherein said isomerization is carried out at a temperature of from about 10° to about 15° C.

7. A process according to claim 1 wherein said alkali metal is sodium.

8. A process according to claim 1 wherein said alkali metal is potassium.

9. A process according to claim 1 wherein the alkali metal is combined with the alumina in a proportion of from about 2 to about 20 percent, by weight, based on the weight of the alumina.

10. A process according to claim 1 wherein the alkali metal is combined with the alumina in a proportion of from about 7.5 percent to about 10 percent, by weight, based on the weight of the alumina.

* * * * *